United States Patent
Jeong (10) Patent No.: US 12,187,251 B2
(45) Date of Patent: Jan. 7, 2025

(54) METHOD AND APPARATUS FOR CONTROLLING ELECTRO-MECHANICAL BRAKE

(71) Applicant: HYUNDAI MOBIS CO., LTD., Seoul (KR)

(72) Inventor: Hee Jeong, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 154 days.

(21) Appl. No.: 17/493,211

(22) Filed: Oct. 4, 2021

(65) Prior Publication Data
US 2022/0126808 A1    Apr. 28, 2022

(30) Foreign Application Priority Data

Oct. 22, 2020  (KR) .................. 10-2020-0137354

(51) Int. Cl.
*B60T 13/74*      (2006.01)
*B60T 7/12*       (2006.01)
(Continued)

(52) U.S. Cl.
CPC ............ B60T 13/745 (2013.01); *B60T 7/12* (2013.01); *B60T 8/24* (2013.01); *B60T 13/142* (2013.01);
(Continued)

(58) Field of Classification Search
CPC ... B60T 8/88; B60T 8/92; B60T 8/885; B60T 17/18; B60T 17/22; B60T 17/221;
(Continued)

(56) References Cited

U.S. PATENT DOCUMENTS 6,092,880 A *   7/2000  Towers ............... B60T 8/442
                                                        303/122.09
10,308,229 B2 * 6/2019  Chung ................ B60T 7/122
(Continued)

FOREIGN PATENT DOCUMENTS

CN       103129538 A     6/2013
CN       107792044 A     3/2018
(Continued)

OTHER PUBLICATIONS

Office Action dated Jun. 9, 2023 in corresponding Chinese patent application No. 202111220669.8.
(Continued)

*Primary Examiner* — Bradley T King
*Assistant Examiner* — James K Hsiao
(74) *Attorney, Agent, or Firm* — NovoTechIP International PLLC (57) ABSTRACT

An electro-mechanical brake device comprising: a sensor unit comprising one or more sensors; an electronic parking brake (EPB) configured to fix a wheel of the vehicle when the vehicle is parked; a hydraulic braking unit configured to supply a braking force to a wheel brake using hydraulic pressure generated at a master cylinder; a driving control unit configured to determine whether braking is required for the vehicle based on at least one of a driver's braking intention, a change in the hydraulic pressure at the master cylinder, a vehicle status, an engine status and a transmission state, and further configured to determine whether an actuator has failed; and an actuator decision unit configured to, when the driving control unit determines that braking is required for the vehicle, brake the vehicle using any one of the hydraulic braking unit and the EPB depending on whether the actuator has failed.

8 Claims, 8 Drawing Sheets

(51) Int. Cl.
  *B60T 8/24* (2006.01)
  *B60T 13/14* (2006.01)
(52) U.S. Cl.
  CPC ....... *B60T 2201/03* (2013.01); *B60T 2201/10* (2013.01)
(58) Field of Classification Search
  CPC ........ B60T 7/122; B60T 7/12; B60T 2201/06; B60T 13/745; B60T 13/142; B60T 8/24; B60T 2201/03; B60T 2201/10; B60T 2270/402; B60T 7/042; B60T 13/74; B60T 13/71; B60T 8/172; B60T 8/245; B60T 8/171; B60W 10/18; B60W 30/18118; B60R 13/0232; B60Q 1/44; F16D 65/14
  See application file for complete search history.

(56) References Cited

U.S. PATENT DOCUMENTS

| | | | | |
|---|---|---|---|---|
| 2002/0050739 | A1* | 5/2002 | Koepff | B60T 8/348 303/122.09 |
| 2002/0096003 | A1* | 7/2002 | Yamada | B60T 8/4872 74/20 |
| 2002/0117891 | A1* | 8/2002 | Harris | B60T 13/58 303/122.04 |
| 2006/0267402 | A1* | 11/2006 | Leiter | B60T 13/741 303/20 |
| 2007/0278856 | A1* | 12/2007 | Craig | B60T 13/588 303/3 |
| 2009/0260929 | A1* | 10/2009 | Boyle | F16D 65/22 188/326 |
| 2013/0211683 | A1* | 8/2013 | Philpott | B60T 7/16 701/70 |
| 2013/0231839 | A1* | 9/2013 | Baehrle-Miller | B60T 13/588 701/70 |
| 2013/0282249 | A1* | 10/2013 | Heise | B60T 13/746 701/70 |
| 2013/0332042 | A1* | 12/2013 | Beever | B60T 7/122 701/70 |
| 2014/0015310 | A1* | 1/2014 | Hanzawa | B60T 17/22 303/3 |
| 2015/0251639 | A1 | 9/2015 | Sautter et al. | |
| 2017/0210361 | A1* | 7/2017 | Kotera | F16D 55/226 |
| 2018/0029574 | A1* | 2/2018 | Mannherz | B60T 13/686 |
| 2018/0056951 | A1* | 3/2018 | Baehrle-Miller | B60T 13/145 |
| 2018/0215355 | A1* | 8/2018 | Kinder | B60T 7/12 |
| 2018/0244255 | A1* | 8/2018 | Kawai | B60T 13/746 |
| 2019/0331221 | A1* | 10/2019 | Shirakawa | B60T 8/1881 |
| 2019/0375388 | A1* | 12/2019 | Meister | B60T 8/885 |
| 2019/0381979 | A1 | 12/2019 | Hirota | |
| 2021/0179051 | A1* | 6/2021 | Alford | B60T 13/142 |

FOREIGN PATENT DOCUMENTS

| | | |
|---|---|---|
| DE | 102017208058 A1 | 11/2018 |
| DE | 10 2016 208 944 A1 | 8/2019 |
| DE | 112018001010 T5 | 11/2019 |
| DE | 102018208877 A1 | 7/2021 |
| KR | 20170090152 A | 8/2017 |
| WO | 2014-173605 A1 | 10/2014 |

OTHER PUBLICATIONS

Office Action issued Jan. 31, 2024 in corresponding Chinese Patent Application No. 202111220669.8.

German Office Action dated Sep. 3, 2024 issued in corresponding German Patent Application No. 10 2021 126 680.7.

\* cited by examiner

METHOD AND APPARATUS FOR CONTROLLING ELECTRO-MECHANICAL BRAKE

CROSS-REFERENCE TO RELATED APPLICATION

This application claims priority to and the benefit of Korean Patent Application No. 10-2020-0137354, filed on Oct. 22, 2020, the disclosure of which is incorporated herein by reference in its entirety.

BACKGROUND

1. Field of the Invention

Embodiments of the present disclosure relate to an electro-mechanical brake device and a method of controlling the same.

2. Discussion of Related Art

The content described in this section merely provides background information about the present disclosure and does not constitute the related art.

As braking devices for a vehicle, there are hydraulic braking devices and electronic braking devices. Among the electronic braking devices, there is an electronic parking brake (hereinafter, referred to as EPB) as a braking device for preventing a wheel from rotating while a vehicle is parked. The EPB is usually mounted on two wheels of the vehicle.

Due to a driver's inexperience in operating a gear during traveling of a vehicle, when the driver sets a reverse gear in a situation in which the vehicle travels on a downhill road or sets a forward gear in a situation in which the vehicle travels on an uphill road, an accident may occur. Specifically, there may be a case in which the vehicle is pulled down in a direction opposite to a traveling direction corresponding to a gear set in the vehicle, that is, in a downward direction of a slope. In this case, an engine of the vehicle is turned off, a speed of the vehicle is increased on the slope, and hydraulic pressure due to depressing of a brake pedal is not generated. Thus, the vehicle loses a braking force, which may cause a serious accident.

SUMMARY OF THE INVENTION

The present disclosure is directed to providing an electro-mechanical brake device in which, when an engine is turned off during traveling, a braking intervention timing of an electro-mechanical brake is appropriately set based on a driver's braking intention, whether a master cylinder generates hydraulic pressure, and the like, thereby preventing an accident.

According to at least one aspect, the present disclosure provides an electro-mechanical brake device comprising: a sensor unit configured to generate various types of information of a vehicle; an electronic parking brake (EPB) configured to fix a wheel of the vehicle when the vehicle is parked; a hydraulic braking unit configured to supply a braking force to a wheel brake of the vehicle using hydraulic pressure generated from a master cylinder; a driving control unit configured to determine whether braking is required for the vehicle based on at least one of a driver's braking intention, a change in hydraulic pressure of the master cylinder, a vehicle status, an engine status, and a transmission state and configured to determine whether an actuator has failed; and an actuator decision unit configured to, when the driving control unit determines that braking is required for the vehicle, brake the vehicle using any one of the hydraulic braking unit and the EPB based on whether the actuator has failed.

| REFERNCE NUMERICALS | |
|---|---|
| 100: sensor unit | 111: brake light sensor |
| 112: hydraulic sensor | 113: wheel pressure sensor |
| 114: slope sensor | 115: ignition sensor |
| 116: wheel speed sensor | 117: RPM sensor |
| 118: transmission sensor | 120: driving control unit |
| 121: driver's intention decision unit | 122: pressure change decision unit |
| 123: vehicle status decision unit | 124: engine malfunction decision unit |
| 125: transmission state decision unit | 126: actuator status decision unit |
| 130: actuator decision unit | 140: hydraulic braking unit |
| 141: backup master cylinder | 142: brake pedal |
| 143: main master cylinder | 144: actuator |
| 145: reservoir | 152: caliper |
| 154: disc | 156: motor |

DETAILED DESCRIPTION OF EXEMPLARY EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 1:
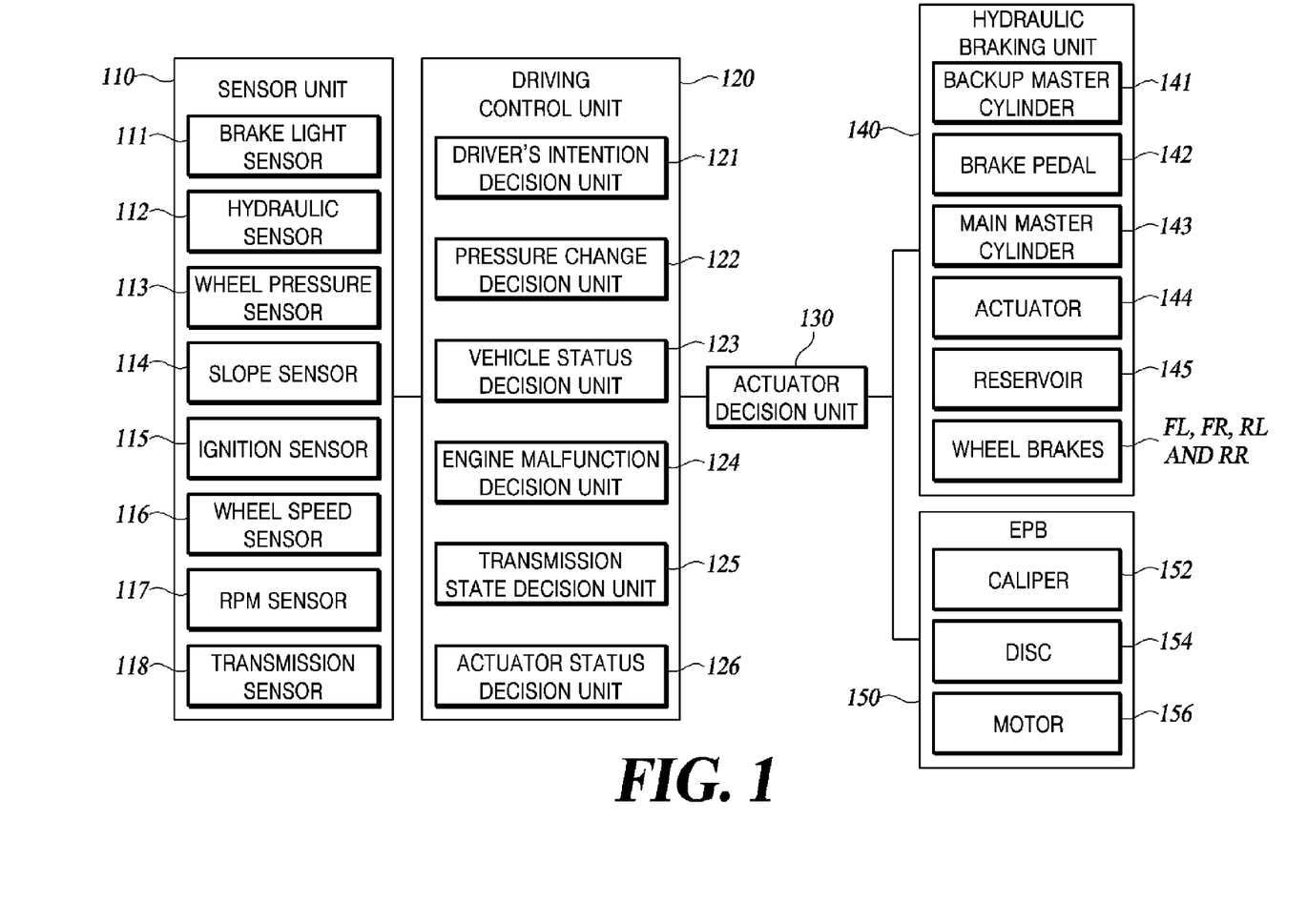
FIG. 1 is a block diagram of an electro-mechanical brake device according to one embodiment of the present disclosure.

FIG. 1 is a block diagram of an electro-mechanical brake device according to one embodiment of the present disclosure.

Referring to FIG. 1, the electro-mechanical brake device according to one embodiment of the present disclosure includes at least one of a sensor unit 110, a driving control unit 120, an actuator decision unit 130, a hydraulic braking unit 140, and an electronic parking brake (EPB) 150.

The sensor unit 110 includes at least one of a brake light sensor (BLS) 111, a hydraulic sensor 112, a wheel pressure sensor 113, a slope sensor 114, an ignition sensor 115, a wheel speed sensor 116, a revolutions per minute sensor (RPM sensor) 117), and a transmission sensor 118.

The brake light sensor 111 detects whether a brake light is turned on, the hydraulic sensor 112 detects a hydraulic pressure inside the hydraulic braking unit 140, the wheel pressure sensor 113 detects a pressure of a wheel cylinder (not shown), the slope sensor 114 detects an inclination of a vehicle, the ignition sensor 115 detects whether an engine is turned on, the wheel speed sensor 116 detects a wheel speed of a wheel, the RPM sensor 117 detects RPM of the engine, and the transmission sensor 118 detects a gear stage of a transmission (not shown).

The sensor unit 110 transmits various pieces of detected information to the driving control unit 120.

The driving control unit 120 includes at least one of a driver's intention decision unit 121, a pressure change decision unit 122, a vehicle status decision unit 123, an engine malfunction decision unit 124, a transmission state decision unit 125 and an actuator status decision unit 126.

Each component of the driving control unit 120 will be described in more detail with reference to FIGS. 2 to 7.

The actuator decision unit 130 determines an actuator for generating a braking force based on a result value determined by the driving control unit 120. Here, the actuator refers to the hydraulic braking unit 140 or the EPB 150. A process in which the actuator decision unit 130 determines the actuator for generating the braking force will be described in more detail with reference to FIG. 8.

The hydraulic braking unit 140 includes at least one of a backup master cylinder 141, a brake pedal 142, a main master cylinder 143, an actuator 144, a reservoir 145, and wheel brakes FL, FR, RL, and RR.

The hydraulic braking unit 140 may supply a braking force to the wheel brakes FL, FR, RL, and RR using hydraulic pressure generated from the master cylinders 141 and 143. Here, the master cylinders 141 and 143 collectively refer to the illustrated backup master cylinder 141 and main master cylinder 143.

The backup master cylinder 141 may generate hydraulic pressure through a linear movement of a piston in the backup master cylinder 141 by a driver depressing the brake pedal 142. The generated hydraulic pressure is supplied to the wheel brakes FL, FR, RL, and RR.

Among contents to be described below, forcibly depressing the hydraulic braking unit 140 means that a motor (not shown) of the actuator 144 rotates to forcibly generate hydraulic pressure.

The actuator 144 converts a rotational force of the motor into a linear force, and a piston (not shown) in the main master cylinder 143 is linearly moved to generate hydraulic pressure. The generated hydraulic pressure is supplied to the wheel brakes FL, FR, RL, and RR.

The reservoir 145 may be a storage tank which stores brake fluid and may supply the brake fluid to the backup master cylinder 141 or the main master cylinder 143 such that the backup master cylinder 141 or the main master cylinder 143 may supply a braking force to the wheel brakes FL, FR, RL, and RR.

The wheel brakes include a first wheel brake FL installed on a front left wheel, a second wheel brake FR installed on a front right wheel, a third wheel brake RL installed on a rear left wheel, and a fourth wheel brake RR installed on a rear right wheel.

The EPB 150 may be integrally formed with a caliper 152 so as to generate a braking force.

In the EPB 150, the caliper 152 is operated to compress a disc 154 mounted to rotate with the wheel of the vehicle, thereby generating a braking force. That is, in order to generate a braking force, the caliper 152 is operated using a mechanical mechanism driven by a motor 156. When the driving control unit 120 drives the motor 156, a rotational force of the motor 156 is converted into a linear force and transmitted to a piston in a cylinder of the caliper, and then, when the piston moves to compress a friction pad, the friction pad compresses and clamps both surfaces of a disc (not shown) to generate a braking force. The EPB 150 is used to fix the wheel of the vehicle when the vehicle is parked.

Figure 2:
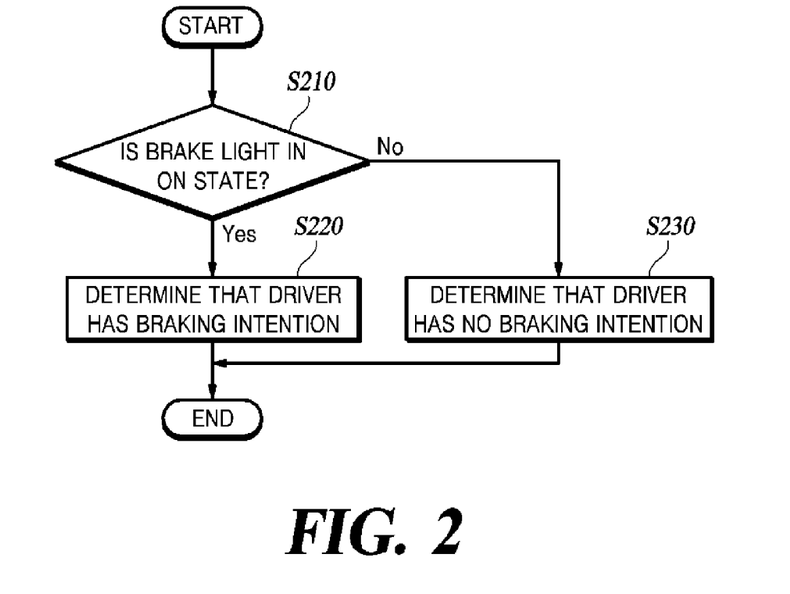
FIG. 2 is a flowchart illustrating an algorithm of a driver's intention decision unit according to one embodiment of the present disclosure.

FIG. 2 is a flowchart illustrating an algorithm of a driver's intention decision unit according to one embodiment of the present disclosure.

Referring to FIG. 2, a driver's intention decision unit 121 uses a brake light sensor 111 to determine a driver's braking intention.

The driver's intention decision unit 121 determines whether a brake light is in an on state using information detected by the brake light sensor 111 (S210).

When the brake light is in an on state, the driver's intention decision unit 121 determines that a driver has expressed a braking intention (S220). On the other hand, when the brake light is not in an on state, the driver's intention decision unit 121 determines that the driver has not expressed any braking intention (S230).

When the driver's intention decision unit 121 completes the determination of the driver's braking intention, the present algorithm is ended.

Figure 3:
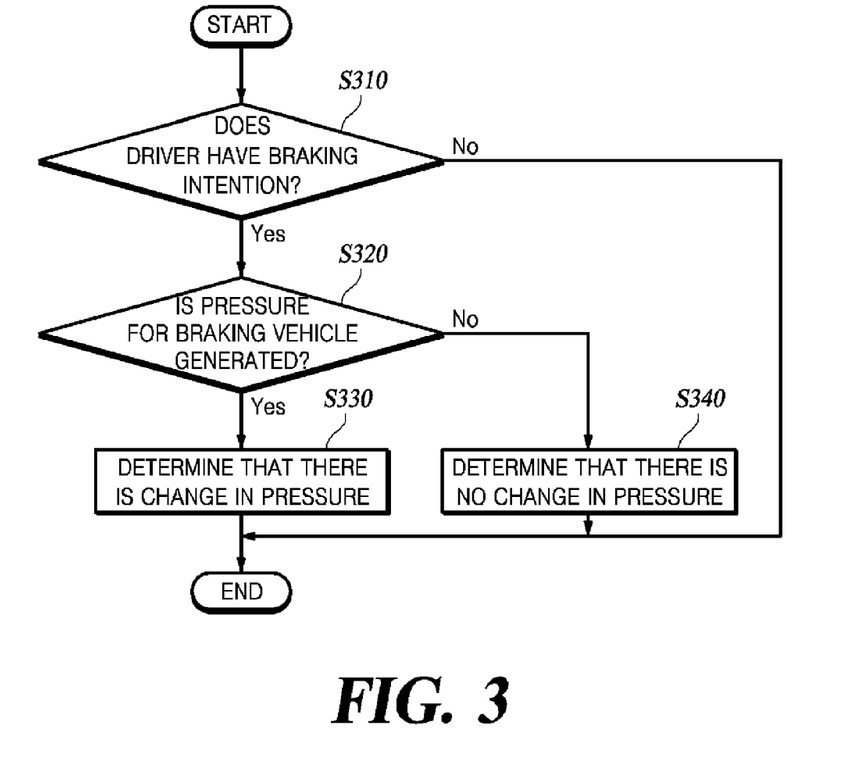
FIG. 3 is a flowchart illustrating an algorithm of a pressure change decision unit according to one embodiment of the present disclosure.

FIG. 3 is a flowchart illustrating an algorithm of a pressure change decision unit according to one embodiment of the present disclosure.

Referring to FIG. 3, a pressure change decision unit 122 uses a hydraulic sensor 112 and a wheel pressure sensor 113 to determine whether pressure for braking a vehicle is generated.

The pressure change decision unit 122 determines whether a driver has a braking intention using a result value in which the driver's intention decision unit 121 determines a driver's braking intention in FIG. 2 (S310).

When the driver has no braking intention, the present algorithm is ended. On the other hand, when the driver has a braking intention, the pressure change decision unit 122 determines whether pressure for braking the vehicle is generated using information detected by the hydraulic sensor 112 and the wheel pressure sensor 113 (S320).

The pressure change decision unit 122 determines whether a pressure inside master cylinders 141 and 143 is increased or a pressure inside a wheel cylinder is increased based on information measured by the hydraulic sensor 112 and the wheel pressure sensor 113.

When it is determined that the pressure of any one of the master cylinders 141 and 143 and the wheel cylinder is increased, the pressure change decision unit 122 determines that there is a change in pressure, that is, that the pressure for braking the vehicle is generated (S330). On the other hand, when it is determined that the pressure of any one of the master cylinders 141 and 143 and the wheel cylinders is not increased, the pressure change decision unit 122 determines that there is no change in pressure, that is, the pressure for braking the vehicle is not generated (S340).

When the determination of whether pressure is generated is completed, the present algorithm is ended.

Figure 4:
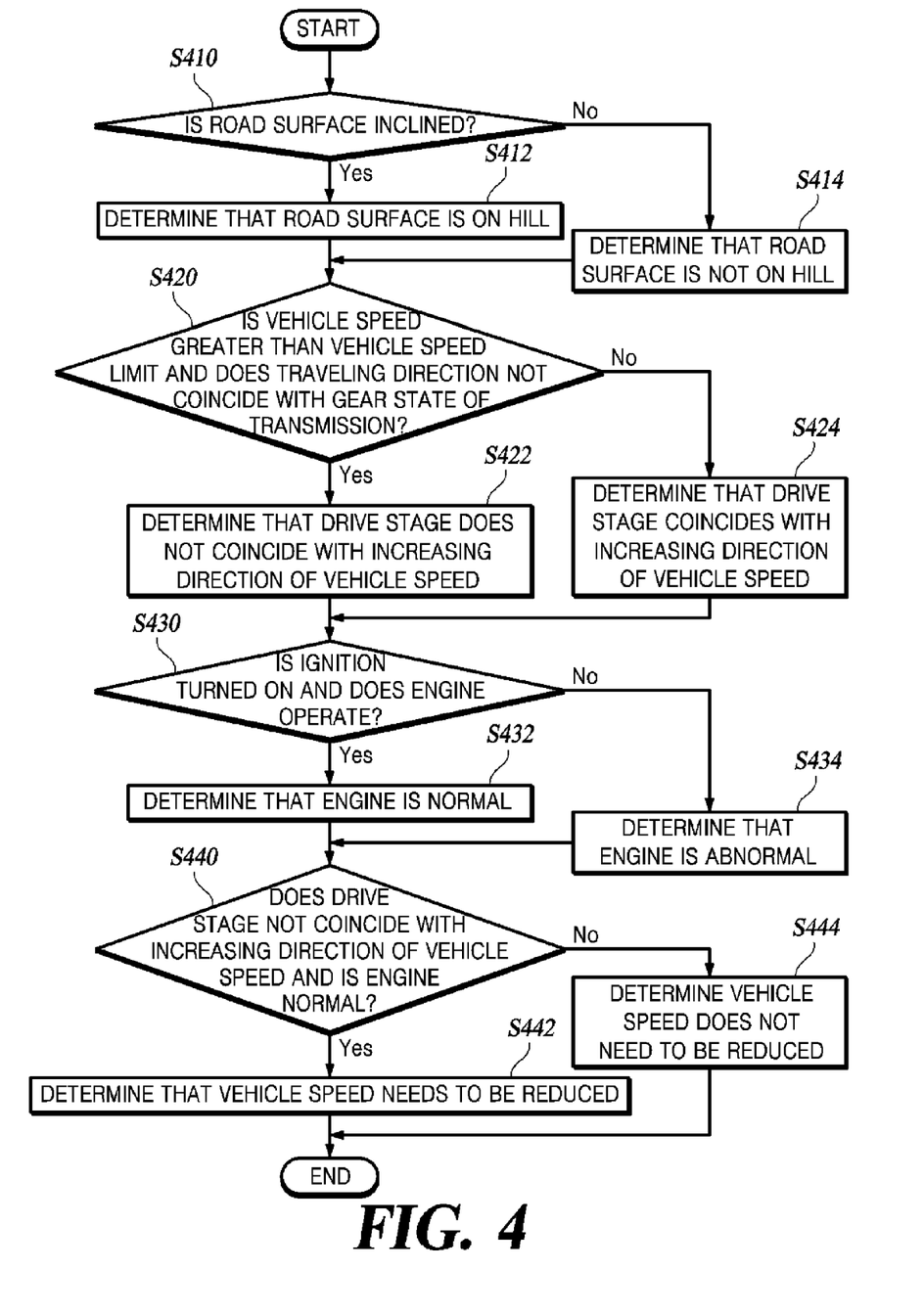
FIG. 4 is a flowchart illustrating an algorithm of a vehicle status decision unit according to one embodiment of the present disclosure.

FIG. 4 is a flowchart illustrating an algorithm of a vehicle status decision unit according to one embodiment of the present disclosure.

Referring to FIG. 4, a vehicle status decision unit 123 determines a slope of a road surface, an inclination of a vehicle, and whether deceleration is required for the vehicle using a slope sensor 114, an ignition sensor 115, and a wheel speed sensor 116.

The vehicle status decision unit 123 determines whether a road surface on which the vehicle is positioned is on a hill using slope information measured by the slope sensor 114 (S410).

For example, the vehicle status decision unit 123 determines whether the road surface is inclined based on a longitudinal slope in a traveling direction of the vehicle.

When it is determined that the road surface on which the vehicle is positioned is inclined, the vehicle status decision unit 123 determines that the road surface on which the vehicle is positioned is on a hill (S412). On the other hand, when it is determined that the road surface on which the vehicle is positioned is not inclined, the vehicle status decision unit 123 determines that the road surface on which the vehicle is positioned is not on a hill, that is, is a flat surface (S414).

When a condition of the road surface is determined in operation S412 or S414, the vehicle status decision unit 123 determines whether a drive stage coincides with a direction of a vehicle speed increase using wheel speed information detected by a wheel speed sensor 116 and input information of a shift lever (S420).

The vehicle status decision unit 123 determines whether a calculated vehicle speed exceeds a vehicle speed limit in consideration of a traveling state of the vehicle. Here, the vehicle speed limit refers to a vehicle speed calculated by a driving control unit 120. When a wheel speed of the vehicle exceeds the vehicle speed limit and continuously increases, the driving control unit 120 may determine that braking is required. For example, when the driver has expressed a braking intention, but hydraulic pressure is not generated in a master cylinder or a wheel brake and a wheel speed is continuously increased, the driver may be in a dangerous situation, and thus, the vehicle status decision unit 123 may determine that braking is required.

The vehicle status decision unit 123 determines a rotational direction of a wheel based on the wheel speed information and determines an input value of the shift lever based on gear information.

When a value corresponding to a forward direction of the vehicle is input by the shift lever when a traveling direction of the vehicle travels is an uphill direction, or when a value corresponding to a reverse direction of the vehicle is input by the shift lever when a traveling direction of the vehicle travels is a downhill direction, the vehicle status decision unit 123 may determine that the drive stage does not coincide with the direction of the vehicle speed increase. For example, when a D stage gear is input on an uphill road, an engine may be turned off. Therefore, when there is no change in hydraulic pressure by a brake pedal 142, there is a risk that the vehicle descends in a reverse direction on a slope to collide with a vehicle or other objects in the rear direction. In addition, for example, when an R stage gear is input on a downhill road, the engine may be similarly tuned off. Therefore, when there is no change in hydraulic pressure by the brake pedal 142, there is a risk that the vehicle descends in a forward direction on a slope to collide with a vehicle or other objects in the front direction.

When the rotational direction of the wheel corresponds to a forward direction of the vehicle and a value corresponding to a reverse direction of the vehicle is input by the shift lever, or when the rotational direction of the wheel corresponds to a reverse direction of the vehicle and a value corresponding to a forward direction of the vehicle input by the shift lever, the vehicle status decision unit 123 may determine that the drive stage does not coincide with the direction of the vehicle speed increase. For example, such a case is a case in which the R stage gear is input when the vehicle is traveling forward or the D stage gear is input when the vehicle is traveling in reverse. When a direction of a gear is opposite to an actual traveling direction of the vehicle, the engine may be turned off. Therefore, when there is no change in hydraulic pressure by the brake pedal 142, the vehicle status decision unit 123 determines that the drive stage does not coincide with the direction of the vehicle speed increase.

After it is determined whether a traveling direction coincides with a shift stage in operation S422 or S424, the vehicle status decision unit 123 determines whether the engine normally operates using information detected by the ignition sensor 115 (S430).

When the engine is operating in a state in which an ignition of the vehicle is turned on, the vehicle status decision unit 123 determines that the engine is normal (S432).

On the other hand, when the engine does not operate in a state in which an ignition of the vehicle is turned on, the vehicle status decision unit 123 determines that the engine is abnormal (S434).

After it is determined whether the engine is normal in operation S432 or S434, the vehicle status decision unit 123 determines whether to reduce a vehicle speed of the vehicle using result values of operation S420 and S430 (S440).

When a result value of operation S422 is obtained, that is, it is determined that the drive stage does not coincide with the direction of the vehicle speed increase, and when a result value of operation S432 is obtained, that is, it is determined that the engine is normal, the vehicle status decision unit 123 determines that the vehicle speed needs to be reduced (S442). On the other hand, when a result value of operation S424 is obtained, that is, it is determined that the drive stage coincides with the direction of the vehicle speed increase, and when a result value of operation S434 is obtained, that is, it is determined that the engine is abnormal, the vehicle status decision unit 123 determines that a vehicle speed does not need to be reduced (S444).

When the determination of a vehicle status is completed, the present algorithm is ended.

Figure 5:
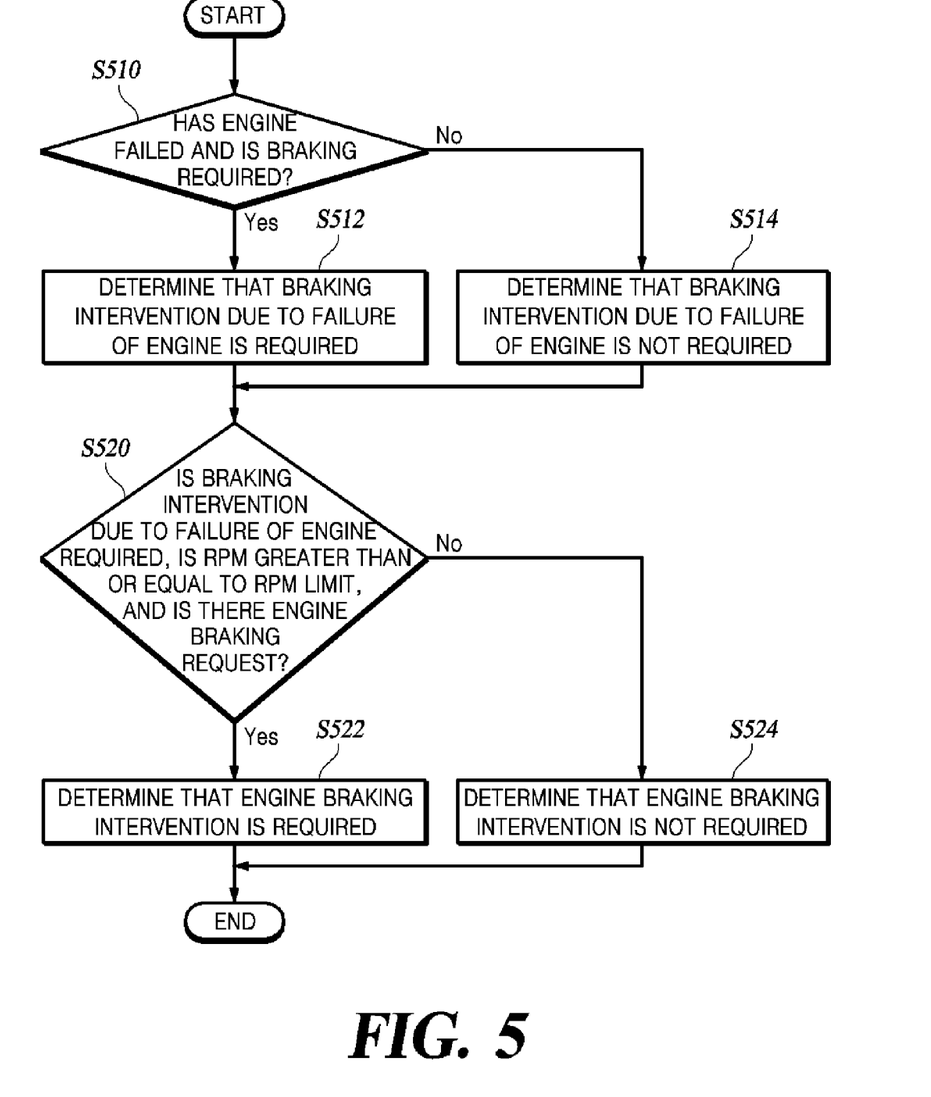
FIG. 5 is a flowchart illustrating an algorithm of an engine malfunction decision unit according to one embodiment of the present disclosure.

FIG. 5 is a flowchart illustrating an algorithm of an engine malfunction decision unit according to one embodiment of the present disclosure.

Referring to FIG. 5, an engine malfunction decision unit 124 has an algorithm for monitoring an engine state, confirming whether it is time to brake a vehicle, and then determining whether to intervene in braking when RPM of an engine is greater than or equal to an RPM limit.

The engine malfunction decision unit 124 determines whether the engine is normal based on information detected by an ignition sensor 115 and an RPM sensor 117 and determines whether braking is required for the vehicle (S510).

The engine malfunction decision unit 124 may determine whether the engine is normal based on operation S430 of FIG. 4. When a failure has occurred in the engine and the ignition sensor 115 detects that an ignition of the vehicle is turned on, since the engine may be turned off, the engine malfunction decision unit 124 determines that braking is required for the vehicle (S512).

On the other hand, when the engine is in a normal state or braking is not required, the engine malfunction decision unit 124 determines that a braking intervention due to a failure of the engine is not required (S514).

After operation S512 or S514, the engine malfunction decision unit 124 determines whether to intervene in engine braking using information detected by the RPM sensor 117 (S520).

When a braking intervention due to a failure of the engine is required based on a result value of operation S512, the RPM of the engine exceeds the RPM limit, and there is an engine braking request, the engine malfunction decision unit 124 determines that an engine braking intervention is required (S522). On the other hand, based on a result value of operation S514, when the RPM of the RPM does not exceed the RPM limit, or when there is no engine braking request, the engine malfunction decision unit 124 determines that an engine braking intervention is not required (S524).

When the determination of whether to intervene in engine braking is completed, the present algorithm is ended.

Figure 6:
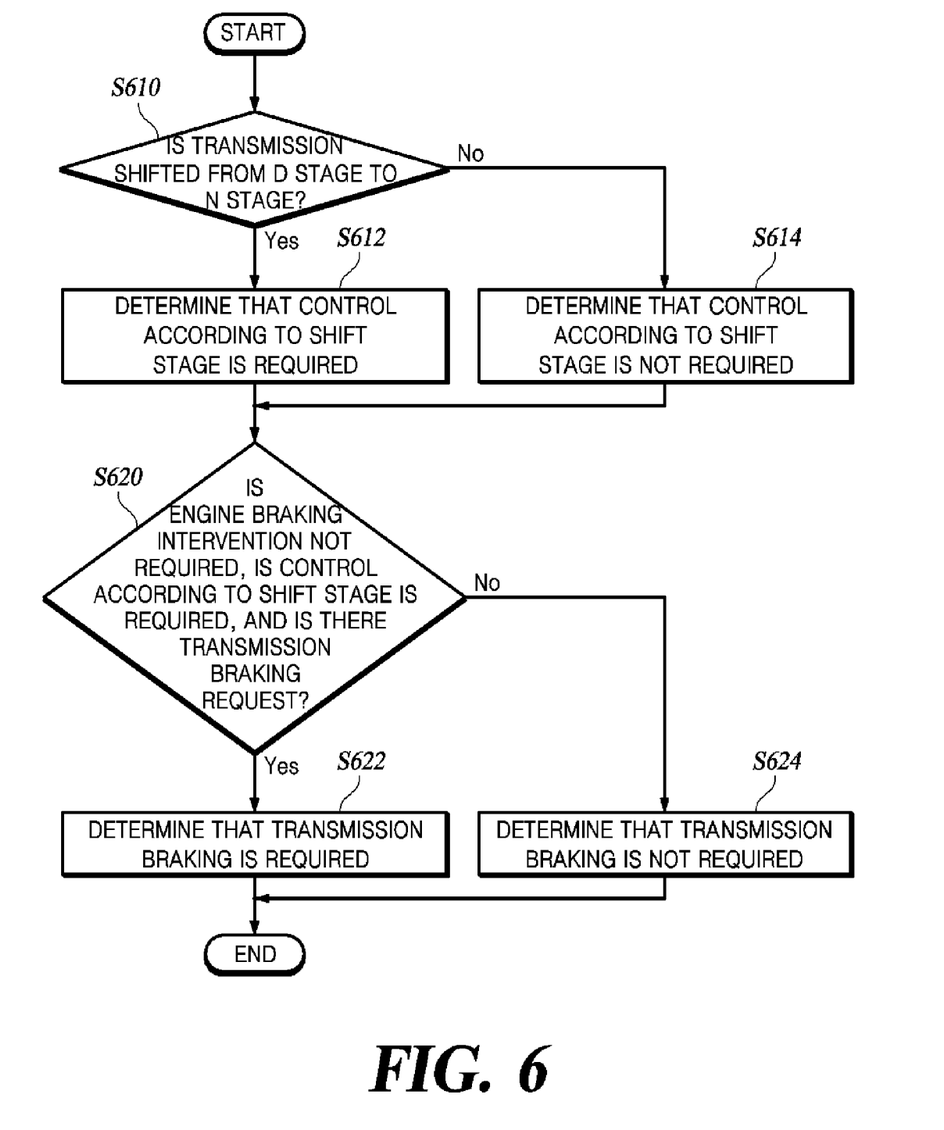
FIG. 6 is a flowchart illustrating an algorithm of a transmission state decision unit according to one embodiment of the present disclosure.

FIG. 6 is a flowchart illustrating an algorithm of a transmission state decision unit according to one embodiment of the present disclosure.

Referring to FIG. 6, a transmission state decision unit 125 has an algorithm for monitoring a transmission state, confirming whether it is time to brake a vehicle, and then determining whether to intervene in transmission braking based on a transmission braking request in a state in which there is no braking request of an engine malfunction decision unit 124 when a drive stage is shifted to a neutral gear stage (N stage).

The transmission state decision unit 125 determines whether a shift stage of a transmission is shifted from the drive stage, that is, a D stage, to the neutral stage, that is, the N stage (S610).

When a gear stage of the transmission is shifted, the transmission state decision unit 125 determines that control for generating a braking force based on the shift stage is required (S612).

On the other hand, when the gear stage of the transmission is not shifted, the transmission state decision unit 125 determines that control for generating a braking force based on the shift stage is not required (S614).

After operation S612 or S614, the transmission state decision unit 125 determines whether a transmission braking intervention is required based on a result value of operation S520 of FIG. 5, a result value of operation S610, and a transmission braking request (S620).

When an engine braking intervention is not required based on a result value of operation S514, control according to a shift of the shift stage is required based on a result value of operation S612, and there is a transmission braking request, the transmission state decision unit 125 determines that a transmission braking intervention is required (S622).

On the other hand, when an engine braking intervention is not required based on a result value of operation S524, the shift stage is not shifted based on a result value of operation S614, or there is no transmission braking request, the transmission state decision unit 125 determines that a transmission braking intervention is not required (S624).

When the determination of whether to intervene in transmission braking is completed, the present algorithm is ended.

Figure 7:
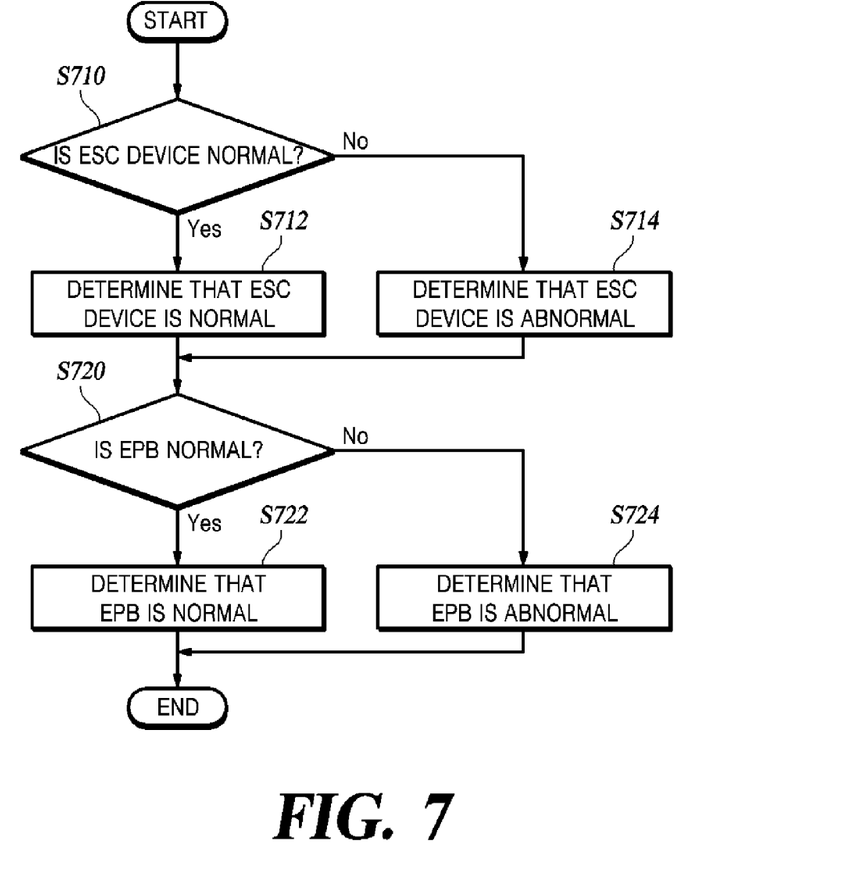
FIG. 7 is a flowchart illustrating an algorithm of an actuator status decision unit according to one embodiment of the present disclosure.

FIG. 7 is a flowchart illustrating an algorithm of an actuator status decision unit according to one embodiment of the present disclosure.

Referring to FIG. 7, an actuator status decision unit 126 monitors the states of an EPB 150 and an electronic stability control (ESC) actuator to determine whether a braking force can be generated in a vehicle.

A vehicle control device of FIG. 7, that is, an ESC device, controls a hydraulic braking unit 140 to generate a hydraulic braking force.

The actuator status decision unit 126 determines whether a failure has occurred in the ESC device (S710). When a failure has not occurred in the ESC device, it is determined that the ESC device is in a normal state and that a hydraulic braking force can be generated in the vehicle (S712).

On the other hand, when a failure has occurred in the ESC device, it is determined that the ESC device is in an abnormal state and that a hydraulic braking force cannot be generated in the vehicle (S714).

After operation S712 or S714, the actuator status decision unit 126 determines whether a failure has occurred in the EPB 150 (S720).

When a failure has not occurred in the EPB 150, it is determined that the EPB 150 is in a normal state and that the EPB 150 can generate a braking force in the vehicle (S722).

On the other hand, when a failure has occurred in the EPB 150, it is determined that the ESC device is in an abnormal state and that the hydraulic braking unit 140 cannot generate a braking force in the vehicle (S724).

When the determination of whether the EPB 150 has failed is completed, the present algorithm is ended.

Figure 8:
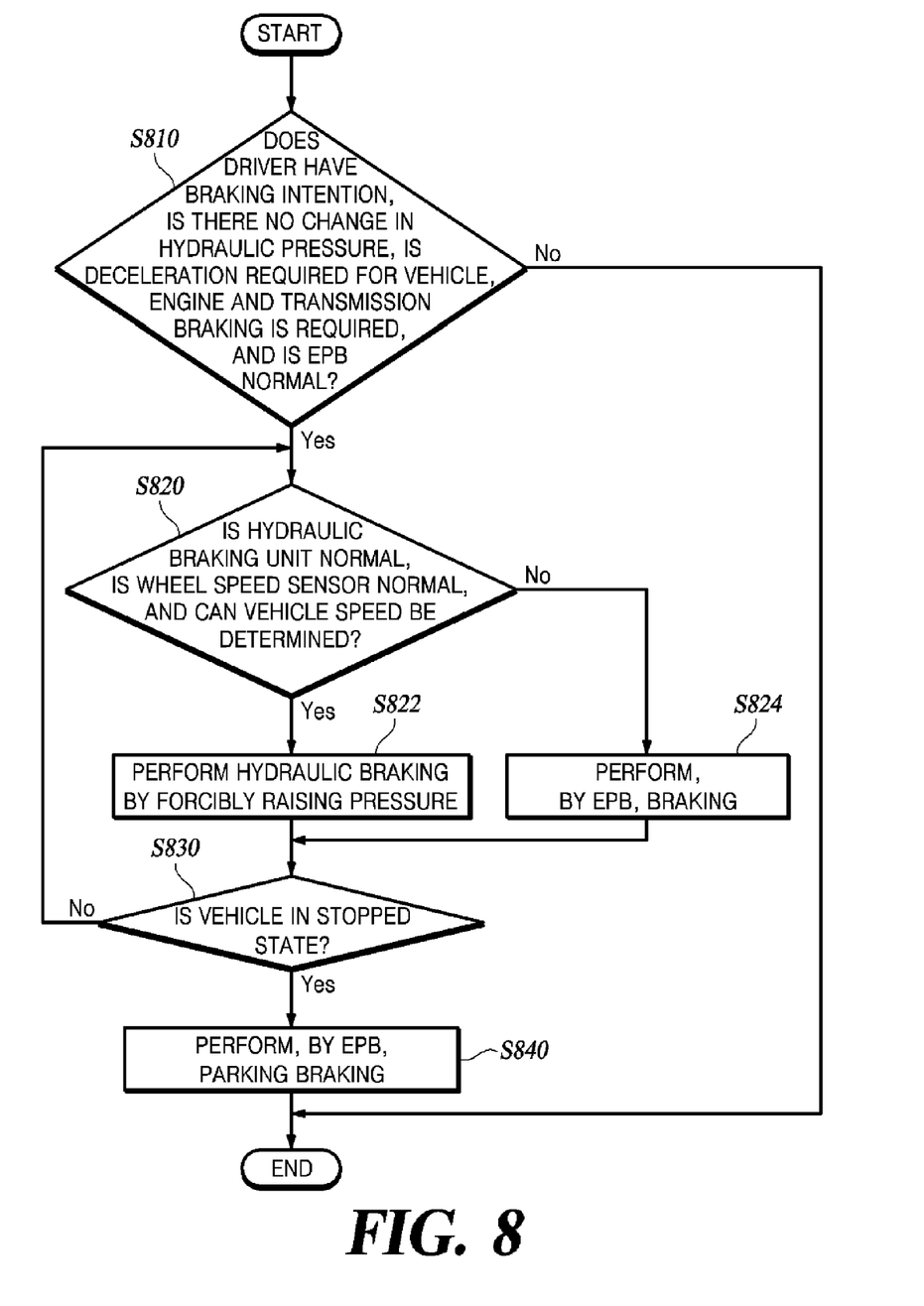
FIG. 8 is a flowchart illustrating an algorithm of an actuator decision unit according to one embodiment of the present disclosure.

FIG. 8 is a flowchart illustrating an algorithm of an actuator decision unit according to one embodiment of the present disclosure.

Referring to FIG. 8, an actuator decision unit 130 determines whether a hydraulic braking unit 140 or an EPB 150 generates a braking force in a vehicle.

The actuator decision unit 130 determines whether to generate a braking force in the vehicle based on a result value of operation S210 of FIG. 2, a result value of operation S320 of FIG. 3, a result value of operation S440 of FIG. 4, a result value of operation S520 of FIG. 5, and a result value of operation S620 of FIG. 6 (S810).

When result values of operations S220, S330, S442, S522, and S622 are derived with reference to the above-described five result values, the actuator decision unit 130 should generate a braking force in the vehicle.

An electro-mechanical brake device according to one embodiment of the present disclosure is designed such that, when an ignition of an engine is turned off during traveling, the actuator decision unit 130 generates a braking force in the vehicle. However, when determining whether to generate a braking force, it is difficult to determine an accurate braking intervention timing based only on whether an ignition of the engine is turned off. Therefore, the electro-mechanical brake device according to one embodiment of the present disclosure determines a braking intervention timing based on the above-described five result values, for example, an increase in RPM of the engine, control of a neutral stage of a transmission, and the like.

When an ignition of the engine is turned off due to a driver's mistake during traveling in R gear on a downhill road or during traveling in D gear on an uphill road, even though the driver depresses a brake pedal 142, a depressing force of the driver cannot be boosted. Accordingly, the probability of an accident is increased. Here, when determining whether to intervene in braking, that is, whether braking is required, in comprehensive consideration of a driver's braking intention, whether a pressure of master cylinders 141 and 143 is increased, and the like, there is an effect in that the vehicle can be safely stopped in a situation in which the ignition is turned off.

When it is determined that a braking force should be generated in the vehicle, the actuator decision unit 130 determines whether to generate a hydraulic braking force or whether an EPB 150 generates a braking force based on a result value of operation S710 of FIG. 7 and whether a wheel speed sensor 116 normally operates (S820).

When it is determined that an ESC device is normal based on operation S712 and it is determined that the wheel speed sensor 116 is normal, a hydraulic braking unit 140 rotates a motor of an actuator to forcibly generate hydraulic pressure. When the hydraulic pressure is generated, reference is made to a result value of operation S410 of FIG. 4. For example, when it is determined that a road surface is on a hill based on a result value of operation S412, in order to generate a braking force of 10 kN, a relatively greater hydraulic pressure is required based on a result value of operation S414 as compared with when a road surface is not on a hill.

On the other hand, when it is determined that the ESC device is abnormal based on operation S714 or it is determined that the wheel speed sensor 116 is not normal, the EPB 150 generates a braking force (S824).

When a braking force is generated in the vehicle according to operation S822 or S824, the actuator decision unit 130 determines whether the vehicle is in a stopped state (S830).

When it is determined that the vehicle is not in a stopped state, since a braking force should be continuously supplied to the vehicle, the procedure returns to operation S820 to generate the braking force.

Meanwhile, when it is determined that the vehicle is in a stopped state, the EPB 150 generates a parking braking force such that the vehicle does not move any more (S840).

When a parking braking force is fully generated, the present algorithm is ended.

As described above, according to the present embodiment, when an engine is turned off during traveling, a braking intervention timing of an electro-mechanical brake is appropriately set based on a driver's braking intention, whether a master cylinder generates hydraulic pressure, and the like, thereby preventing an accident.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:
1. An electro-mechanical brake device comprising:
a sensor unit comprising one or more sensors;
an electronic parking brake (EPB) configured to fix a wheel of a vehicle when the vehicle is parked;
a hydraulic braking unit configured to supply a braking force to a wheel brake of the vehicle using hydraulic pressure generated at a master cylinder, the hydraulic braking unit including an actuator configured to move a piston of the master cylinder to generate the hydraulic pressure;
a driving control unit configured to determine whether braking is required for the vehicle based on at least one of a driver's braking intention, a change in the hydraulic pressure at the master cylinder, a vehicle status, an engine status and a transmission state, and further configured to determine whether the actuator has failed; and
an actuator decision unit configured to, when the driving control unit determines that braking is required for the vehicle, brake the vehicle using any one of the hydraulic braking unit and the EPB depending on whether the actuator has failed,
wherein, to determine whether braking is required for the vehicle, the driving control unit is further configured to:
determine whether the vehicle is positioned on an inclined surface;
in response to determining that the vehicle is positioned on an inclined surface, determining whether a drive stage of the vehicle coincides with a vehicle speed increase direction;
in response to determining that the drive stage of the vehicle does not coincide with the vehicle speed increase direction, determine whether an engine of the vehicle is normal; and
in response to determining that the engine of the vehicle is normal, determine that braking is required for the vehicle,
wherein, to determine whether the drive stage of the vehicle coincides with the vehicle speed increase direction, the driving control unit is further configured to:
determine whether a speed of the vehicle exceeds a vehicle speed limit;
determine whether a traveling direction of the vehicle coincides with the drive stage of a transmission of the vehicle; and
in response to determining that (1) the speed of the vehicle exceeds the vehicle speed limit and (2) the traveling direction of the vehicle does not coincide with the drive stage of the transmission of the vehicle, determine that the drive stage of the vehicle does not coincide with the vehicle speed increase direction,
wherein, to determine whether the engine of the vehicle is normal, the driving control unit is further configured to:
determine whether the vehicle is turned on;
determine whether the engine of the vehicle is operating normally; and
in response to determining that the vehicle is turned on and the engine of the vehicle is operating normally, determine that the engine of the vehicle is normal,
wherein the sensor unit includes a slope sensor configured to detect an inclination of the vehicle and an ignition sensor configured to detect whether the engine of the vehicle is turned on or off, and wherein the driving control unit includes a vehicle status decision unit configured to, when a hydraulic pressure corresponding to the driver's braking intention is not generated, determine at least one of:
  whether braking is required for the vehicle using at least one of a rotational direction of the wheel, the inclination of the vehicle;
  whether the engine operates;
  whether the engine has failed; and
  an input value of a shift lever.

2. The electro-mechanical brake device of claim 1, wherein the actuator decision unit is configured to:
  control the hydraulic braking unit to generate the braking force when it is determined that the hydraulic braking unit is normal; and
  control the EPB to generate the braking force when it is determined that the hydraulic braking unit is abnormal and the EPB is normal.

3. The electro-mechanical brake device of claim 1, wherein;
  the sensor unit includes a brake light sensor (BLS) provided at a brake light of the vehicle, and
  the driving control unit includes a driver's intention decision unit configured to determine whether the driver intends to brake the vehicle using the BLS.

4. The electro-mechanical brake device of claim 1, wherein:
  the sensor unit includes a hydraulic sensor provided at the hydraulic braking unit and a wheel pressure sensor provided at the wheel of the vehicle, and
  the driving control unit includes a pressure change decision unit configured to determine whether the hydraulic pressure generated at the master cylinder or the wheel brake corresponds to the driver's braking intention based on the hydraulic sensor and the wheel pressure sensor.

5. The electro-mechanical brake device of claim 1, wherein, when the engine has failed while an ignition of the vehicle is turned on, the driving control unit is further configured to determine that braking is required for the vehicle.

6. The electro-mechanical brake device of claim 1, wherein the driving control unit is further configured to determine that emergency braking is required for the vehicle in response to detecting:
  the rotational direction of the wheel being corresponding to a forward direction of the vehicle, and the shift lever inputting a first value being corresponding to a reverse direction of the vehicle; or
  the rotational direction of the wheel being corresponding to the reverse direction of the vehicle, and the shift lever inputting a second value corresponding to the forward direction of the vehicle.

7. The electro-mechanical brake device of claim 1, wherein the actuator decision unit is further configured to:
  control the hydraulic braking unit to generate a hydraulic braking force when the hydraulic braking unit generates the hydraulic braking force; and
  control the EPB to generate a parking braking force when the hydraulic braking unit does not generate the hydraulic braking force.

8. The electro-mechanical brake device of claim 1, wherein the driving control unit includes an actuator status decision unit configured to:
  determine whether it is possible to brake the vehicle using the hydraulic braking unit depending on whether the hydraulic braking unit and the sensor unit are normal; and
  determine whether it is possible to brake the vehicle using the EPB depending on whether the EPB is normal.

\* \* \* \* \*